United States Patent
Bader et al.

(10) Patent No.: US 7,287,422 B2
(45) Date of Patent: Oct. 30, 2007

(54) WAY SENSOR ARRANGEMENT FOR A MECHANICAL COMPONENT AND METHOD FOR MOUNTING THE SAME

(75) Inventors: Josef Bader, Friedrichshafen (DE); Gerhard Birkenmaier, Tettnang-Walchesreute (DE); Frank Gessler, Grünkraut (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 11/345,585

(22) Filed: Feb. 1, 2006

(65) Prior Publication Data

US 2006/0196071 A1    Sep. 7, 2006

(30) Foreign Application Priority Data

Feb. 1, 2005    (DE) .................. 10 2005 004 489

(51) Int. Cl.
*G01M 13/02* (2006.01)
(52) U.S. Cl. .................................. 73/118.1
(58) Field of Classification Search ............. 73/116, 73/117.2, 117.3, 118.1, 119 R, 1.79
See application file for complete search history.

(56) References Cited

U.S. PATENT DOCUMENTS 4,823,596 A * 4/1989 Meyers et al. ............ 73/118.1
5,226,312 A 7/1993 Gautier et al.
5,847,272 A * 12/1998 Schneider et al. ......... 73/118.1
5,856,618 A * 1/1999 Beishline .................. 73/118.1
6,481,274 B2 * 11/2002 Rankin ..................... 73/118.1
6,507,292 B1 1/2003 Feichtinger
6,584,428 B1 * 6/2003 Irle et al. ................... 702/151

FOREIGN PATENT DOCUMENTS

| DE | 94 14 869.4 | 12/1994 |
| DE | 691 03 512 T2 | 12/1994 |
| DE | 196 52 971 A1 | 6/1998 |
| DE | 199 48 106 A1 | 3/2001 |
| DE | 203 08 810 U1 | 10/2003 |

* cited by examiner

*Primary Examiner*—Eric S. McCall
(74) *Attorney, Agent, or Firm*—Davis Bujold & Daniel, P.L.L.C.

(57) ABSTRACT

A way sensor arrangement (2) for detecting the displacement of a mechanical component in relation to another component. The way sensor arrangement having a sensor housing (4) that is firmly mounted to a first (gear case 6) of these two components and a sensor carriage (12) that interacts with the housing and can be coupled to the second component (shift rail 18). The invention provides that the sensor carriage (12) is mounted in the sensor housing (4) displaceably in the direction of displacement of the displaceable component (shift rail 18) and that mutually interacting coupling device (catch projection 14, catch recess 16) are provided on the sensor carriage (12) and on the second component (shift rail 18), which can mutually engage with each other.

11 Claims, 2 Drawing Sheets

WAY SENSOR ARRANGEMENT FOR A MECHANICAL COMPONENT AND METHOD FOR MOUNTING THE SAME

This application claims priority from German Application Serial No. 10 2005 004 489.1 filed Feb. 1, 2005.

FIELD OF THE INVENTION

The invention relates to a way sensor arrangement as well as a method for mounting such a way sensor arrangement.

BACKGROUND OF THE INVENTION

Way sensors are used in various technical applications. A typical application includes mechanical gearboxes where the gear wheels are shifted by way of shifting forks, which are connected to manually, semi-automatically or automatically actuated, horizontally displaceable shift rails. The displacement of a shift rail detected by way of the way sensor arrangement is processed further as a way signal in a functional control unit, for example, in order to optimize the synchronization process in a synchronized transmission.

A synchronized gearbox is already known from DE 196 52 971 A1 where, in addition to the mechanical synchronizing devices, a drive device for modifying the rotational speed of a jack shaft is provided, with the aid of which a rotational speed adaptation of the shafts to be coupled with each other is supposed to be brought about during a gear change. Way signals of the shift rail activated during a gear change are input in the functional control unit and the drive device, among other things. The aforementioned publication contains no information about the exact configuration of the way sensor arrangement.

In conventional way, the sensor housing is mounted to a first component and, separately from this, the sensor carriage is mounted to a second component.

The term "sensor housing" is interpreted below as that part of the way sensor arrangement which records the displacement of the sensor carriage and forwards it as a way signal to the functional control unit, for example, via a printed circuit board with transmitting coil arranged therein. The disadvantage with such way sensor arrangements is that in addition, assembly is required for the separate installation of the sensor carriage. Above and beyond this, the risk that the installation of the sensor carriage is accidentally omitted during manufacture of the gearbox cannot be ruled out, particularly when the assembly is performed in a different location than the assembly of the sensor housing. Another disadvantage is that the interface between the sensor carriage and sensor housing is difficult to manage, i.e., that a zero point adjustment of the two components in relation to each other is difficult to achieve, and that varying air gap tolerances between the first and second components caused by manufacturing tolerances may impair the transmission of the signal, particularly that larger air gap tolerances impact negatively on signal accuracy.

Against this background, it is the object of the invention to create a way sensor arrangement as well as a method for the assembly thereof, which have the following advantages compared to conventional systems: assembly is supposed to be simpler and more reliable; the interface and air gap tolerance problems are supposed to be reduced; the sensor carriage is supposed to remain attached captively to the sensor housing at all times, and the sensor carriage is supposed to be connected easily to the second component without separate assembly.

SUMMARY OF THE INVENTION

The invention is based on the realization that the above-described technical objective is best achieved in that the sensor housing and the sensor carriage form an inseparable unit that is produced following the rules of precision manufacture, wherein the sensor carriage during assembly of the way sensor arrangement is connected to that component, the displacement movement of which is supposed to be measured.

Accordingly, the invention proceeds from a way sensor arrangement that is used to detect the displacement of a mechanical component in relation to another component, which arrangement comprises a sensor housing or the like that can be mounted to a first component and a sensor carriage that interacts with the first component and can be coupled to the second component.

The following measures are suggested to accomplish the objective posed, wherein the position and directional information relates to the way sensor arrangement and/or the sensor housing in a state in which it is mounted to the first component. The sensor carriage is mounted in the sensor housing such that it can be displaced in the direction of the displacement of the displaceable component and, on one hand, mutually interacting coupling device are provided on the sensor carriage and, on the other hand, on the second component, which means can engage with each other.

In one configuration of the invention, the coupling device comprises spring-loaded prestressed detent devices, which automatically latch in a defined displacement position of the first component in relation to the second component. This way, the sensor carriage can be coupled extremely easily to the displaceable component in that the sensor housing with the sensor carriage seated therein is first mounted to the first component independently from the position of the displaceable component, and then the second displaceable component is slid in the defined displacement position.

One constructional configuration of the way sensor arrangement provides that catch elements that are pretensioned by way of spring devices are arranged on the sensor carriage, which elements in the case of a defined displacement position of the displaceable component latch to the catch elements provided in this component.

To ensure that the way sensor arrangement (following completion of the assembly) has an exact zero point adjustment, for example, it is necessary that the sensor carriage assumes a defined position in the sensor housing the moment it is coupled to the second component. Accordingly, it is required that the sensor carriage is fixed in a defined position in the sensor housing in the "as delivered state" and in the assembled state, i.e., the state following assembly of the sensor housing to the first component, and prior to being coupled to the second component.

In order to ensure this defined position of the sensor carriage in the "as delivered state" and the assembly state, it is provided according to a preferred configuration of the invention that the catch elements of the sensor carriage and/or components connected thereto can be adjusted in relation to the sensor housing between a first completely extended end position corresponding to the "as delivered state" and a second completely retracted end position corresponding to the assembly state, and that in the first and second end positions retention devices that are formed on the catch elements and/or the components connected thereto as well as on the sensor housing mutually engage with each other.

The retention devices prevent a displacement of the sensor carriage in the sensor housing, wherein the same are disengaged when they assume an intermediate position between the first and the second end positions corresponding to an operating state, thus allowing the sensor carriage to be displaced together with the second component to effectively measure the displacement.

In the "as delivered state" of the way sensor arrangement, the catch elements assume their first completely extended end position. In this case, the sensor carriage, as described above, is locked in a defined position in the displacement direction. During assembly of the way sensor arrangement to the first component, the catch elements rest against the second component and are pushed back by it into the second end position in which the sensor carriage is also locked in the displacement direction.

During a subsequent displacement of the second component, the catch elements formed on this component are congruent with the catch elements formed on the sensor carriage so that they latch with each other, thus disengaging the retention devices and releasing the sensor carriage for displacement in relation to the sensor housing.

In a first construction variation of the way sensor arrangement of the invention, the sensor carriage comprises a cursor tab that can be adjusted on the sensor housing to a first end position determined by the stop and a second end position in a direction perpendicular to the displacement movement of the sensor carriage, which a catch projection is configured on a cursor tab which can engage with a catch recess on the second component.

The cursor tab carries a cursor carrier that can be displaced in the same direction, where spring devices are arranged between the cursor tab and the cursor carrier which, on one hand, press the cursor carrier against the sensor housing and, on the other hand, push the cursor tab in the direction of the first end position. The cursor tab and the cursor carrier are forced apart by the associated spring devices and are clamped between the sensor housing and the second component.

Stop surfaces defining the first end position and/or the second end position of the cursor tab are provided with mutually interacting retention projections or retention recesses, which prevent a displacement of the sensor carriage in relation to the sensor housing in these end positions.

In another construction variation of the way sensor arrangement, the sensor carriage comprises a cursor carrier, which cannot be displaced in a direction perpendicular to the displacement direction and on which at least one latch or the like is arranged, which can be moved from a first end position to a second end position transversely to the displacement direction by way of a spring-loaded elastic arm, which latch engages in catch recesses formed on the sensor housing in the two end positions.

This construction variation is simpler in terms of design than the first construction variation described above, as will be illustrated based in an example.

However, it meets the aforementioned requirement of a defined position of the sensor carriage in the "as delivered state" and in the assembly state in a similar manner.

When using a way sensor arrangement, according to the second construction variation for capturing the displacement of a shift rail or the like, having a substantially round cross-section as that encountered in the abovementioned mechanical gearboxes, according to the invention, it is provided that the cursor carrier comprises two spring-loaded, elastic arched arms that encompass the gearshift rod and carry a latch, respectively, and that a peripheral groove is formed on the shift rail for receiving the latches as will be explained in more detail with an example of the embodiment.

A method for mounting a way sensor arrangement of the kind described above comprises, in general, the following steps:

First, the sensor housing is mounted to the first component and then the coupling devices of the sensor carriage and of the second component are mutually engaged. When the coupling device includes spring-loaded, pre-tensioned detent devices, the second component—following the installation of the way sensor arrangement on the first component—is moved into the defined displacement position at which the detent devices automatically snap in place.

If the catch elements can be adjusted between two end positions in which retention devices are engaged and prevent a displacement of the sensor carriage in the sensor housing, the assembly method provides that the sensor housing is mounted to the first component, wherein the catch elements are adjusted from the first end position, which locks the sensor carriage in the displacement direction into the second locking end position by coming in contact with the second component.

Subsequently, the second component is adjusted to the defined displacement position, where the catch elements move from the second end position to an intermediate position in which the retention devices are disengaged.

BRIEF DESCRIPTION OF THE DRAWINGS

The invention will now be described, by way of example, with reference to the accompanying drawings in which.

DETAILED DESCRIPTION OF THE INVENTION

Figure 1:
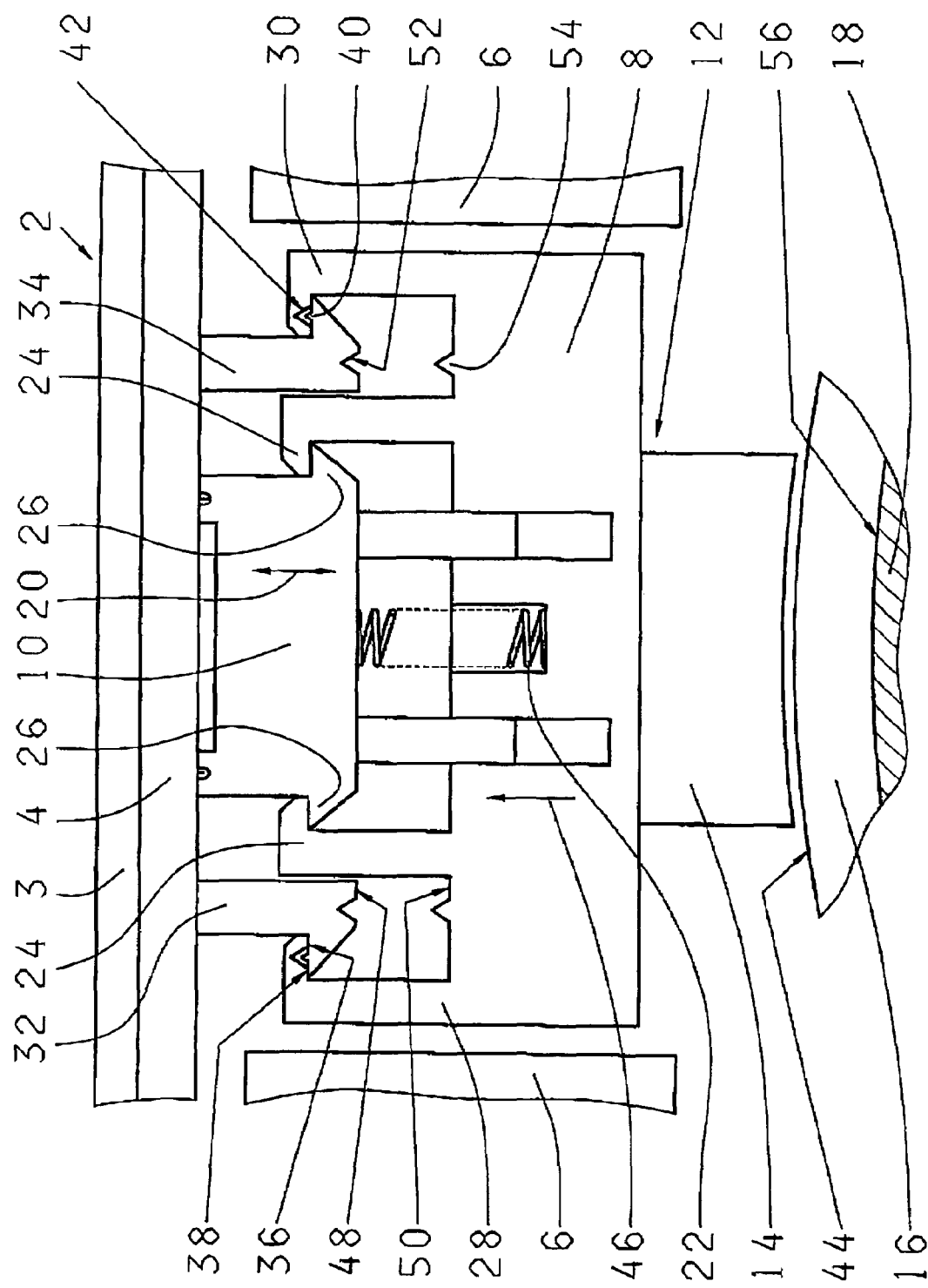
FIG. 1 is a schematic cross-sectional view of a way sensor arrangement with a sensor carriage, which comprises a cursor carrier, a cursor tab and spring devices arranged between them.

The way sensor arrangement, as seen in FIG. 1 and described in the following, shows an arrangement used, for example, in a mechanical gearbox, in order to detect the displacement of a shift rail.

A way sensor arrangement 2 comprises a sensor housing 4, which is mounted in a gear housing 6 in a way that is not shown in detail. A printed circuit board 3, on which the coil is not shown, is arranged on the sensor housing 4, which board is used to transmit a sensed way signal to the aforementioned functional control unit of the gearbox.

A sensor carriage 12, which comprises a cursor tab 8 and a cursor carrier 10 is arranged in or on the sensor housing 4 displaceably in principle in a direction perpendicular to the drawing plane. It can, however, also be locked thereon, as will be illustrated below. A catch projection 14 is arranged on the cursor tab 8, which projection can engage with a catch recess 16 configured as a peripheral groove of a shift rail 18 that can, likewise, be displaced in a direction perpendicular to the drawing plane.

The cursor tab 8 is mounted on the cursor carrier 10 displaceably in a direction that is perpendicular to the displacement movement of the sensor carriage 12 and corresponds to a double arrow 20. In the illustrated example, spring device 22 is a helical compression spring, which is arranged between the cursor carrier 10 and the cursor tab 8 and force the cursor carrier 10 and the cursor tab 8 apart, wherein the cursor carrier 10 is held in the illustrated completely straddled position by stop devices 24 and/or 26 formed on the cursor tab 8 and/or cursor carrier 10.

The cursor tab 8 is provided with lateral brackets 28, 30, which apply a load on brackets 32, 34 provided on the sensor housing 4, as is shown in FIG. 1. In doing so, stop surfaces 36 and/or 38 formed on the brackets 28, 30 on one hand and/or on the brackets 32, 34 on the other hand are mutually brought in contact with each other by the spring devices 22.

It should be noted here that the arrangement illustrated in FIG. 1 represents way sensor arrangement 2 "as delivered," for example, at the facility of a gear manufacturer, i.e., a state before the way sensor arrangement 2 is mounted in the gear case 6.

FIG. 1 further shows that mutually interacting retention projections 40 and/or retention recesses 42 are formed on the stop surfaces 36 and/or 38, which projections and/or recesses in the illustrated "as delivered state" are mutually engaged and prevent a displacement of the sensor carriage 12 in relation to the sensor housing 4 in a direction perpendicular to the drawing plane so that the sensor carriage 12 has a defined position in relation to the sensor housing 4.

When the way sensor arrangement 2 and/or the sensor housing 4 is connected to the gear case 6, initially the catch projection 14 formed on the cursor tab 8 rests against an outer circumference 44 of the shift rail 18. The cursor tab 8 is thus displaced in the direction of an arrow 46 towards the cursor carrier 10 until stop surfaces 48 formed on the brackets 32 and 34 come in contact with stop surfaces 50 formed on the cursor tab 8. In turn, this leads to the fact that the retention recesses 52 and/or retention projections 54 formed on the stop surfaces 48 and/or 50 mutually engage, so that even in this position which is referred to as the assembly state, the sensor carriage 12 is locked in relation to the sensor housing 4 in the displacement direction, i.e., in a direction perpendicular to the drawing plane.

The shift rail 18 is subsequently displaced so far out of the drawing plane that the catch projection 14 snaps into the catch recess 16, wherein the catch projection 14 is supported on a bottom 56 of the catch recess 14. In this position, which is referred to as the operating state, neither the stop surfaces 36, 38 nor the stop surfaces 48, 50 are in contact with each other, so that the associated retention projections 40, 42 and/or 52, 54 are not engaged and the sensor carriage 8 can be displaced in the displacement direction in relation to the sensor housing 4.

This concludes the assembly of the way sensor arrangement 2 in the gear case 6.

Figure 2:
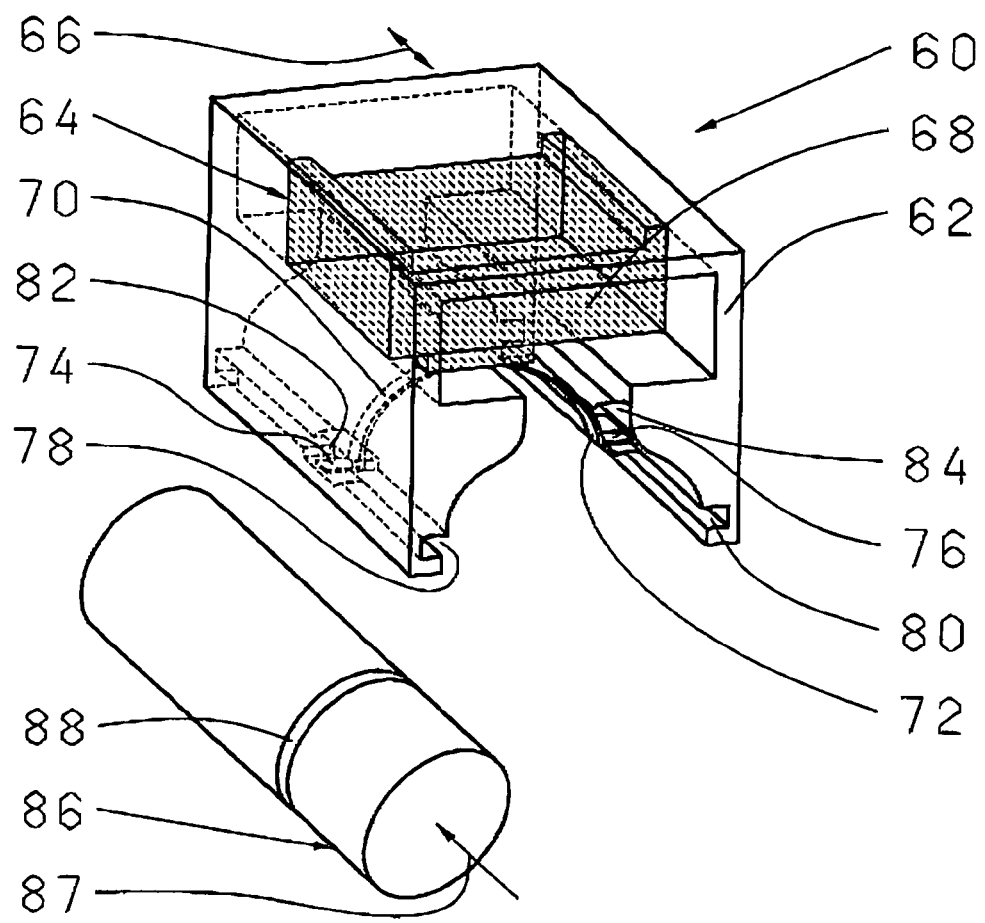
FIG. 2 is a perspective view of a way sensor arrangement with a sensor carriage, which comprises a cursor carrier with two spring-loaded elastic arms.

FIG. 2 shows another embodiment of a way sensor arrangement 60 which, in turn, can be used to record the displacement of a shift rail in a mechanical gearbox.

A sensor carriage 64 is arranged displaceably in the direction of a double arrow 66 in a sensor housing 62. The sensor carriage 64 comprises a cursor tab 68, on the bottom side of which two spring-loaded elastic arms 70, 72 are arranged. On the outer ends of the two arms 70 and/or 72 laterally projecting latches 74 and/or 76 are arranged, which engage in guide grooves 78 and/or 80 that are formed on the sensor housing and extend in the displacement direction indicated by the double arrow 66.

The guide grooves 78, 80 comprise recesses on the top and bottom in certain locations of their longitudinal extensions, of which recesses FIG. 2 shows only upper recesses 82 and/or 84 for clarity reasons. These recesses can receive the latches 74 and/or 76 when the arms 70 and/or 72 are bent upward or downward, as will be described below in detail based on FIG. 3.

In the "as delivered" state shown in FIG. 2, the arms 70, 72 are largely relaxed and engage in (not illustrated) lower recesses of the guide grooves 78 and 80, so that the sensor carriage 64 is locked in the direction of the double arrow 66.

When the way sensor arrangement 60 is mounted in a gear case, which is (not shown), the arms 70 and 72 rest against the circumferential surface of a shift rail 86 and are bent elastically upward until the latches 74, 76 engage in the upper recesses 82, 84 of the guide grooves 78, 80. In this assembly state as well as the sensor carriage 64 is locked in the direction of the double arrow 66.

In a subsequent assembly step, the shift rail 86 is displaced in the illustrated case in a longitudinal direction 87 until the arms 70, 72 with the latches 74, 76 arranged therein engage in a catch recess 88 configured as a peripheral groove. The arms 70, 72 rest against the bottom of the catch recess 88, wherein they assume an intermediate position in which the latches 74, 76 are aligned with the guide grooves 78, 80 so that the sensor carriage 64 is no longer locked in the direction of the double arrow 66.

Figure 3:
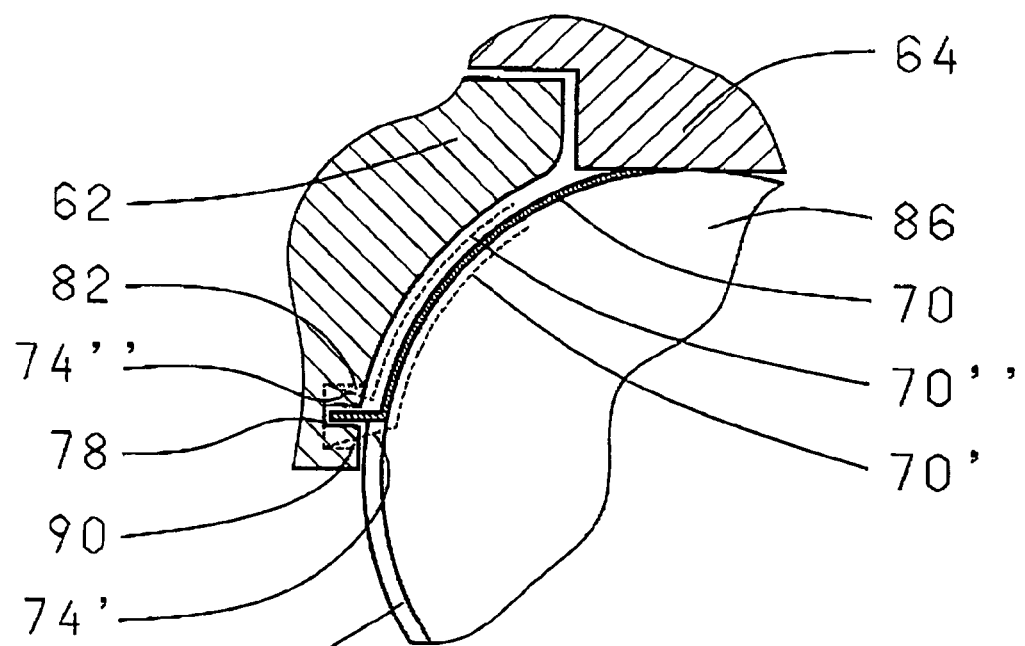
FIG. 3 is a cross-sectional detailed view of FIG. 2.

FIG. 3 shows a partial cross-sectional view of the sensor housing 62, the sensor carriage 64 with an elastic arm 70 and the shift rail 86 with the catch recess 88. As explained above, the arm 70 assumes a lower position 70' in the "as delivered" state, in which the associated latch 74' engages in a lower recess 90 of the guide groove 78, so that the sensor carriage 64 is locked in the direction perpendicular to the drawing plane.

During assembly of this way sensor arrangement, the arm is first bent upward in the position given reference numeral 70" by coming in contact with the outer circumference of the shift rail 86, wherein the associated latch 74" engages in the upper recess 82 of the guide rail 78, so that in this assembly state the sensor carriage 64 is in turn locked in the displacement direction 66.

If the arm 70 can drop into the catch recess 88 by displacing the shift rail 86 in the longitudinal direction 87, the arm is held in a center position by the bottom of the catch recess, in which the latch 74 can be freely displaced in the guide groove 78 and the sensor carriage 64 can be picked up by the shift rail 86 for displacement measuring purposes.

REFERENCE NUMERALS 2 way sensor arrangement
3 printed circuit board
4 sensor housing
6 gear case
8 cursor tab
10 cursor carrier
12 sensor carriage
14 catch projection
16 catch recess
18 shift rail
20 double arrow
22 spring device
24 stop device
26 stop device
28 bracket
30 bracket
32 bracket
34 bracket
36 stop surface
38 stop surface 40 retention projections
42 retention recesses
44 outer circumference
46 arrow
48 stop surfaces
50 stop surfaces
52 retention recesses with transmitting coil
54 retention projections
56 bottom
60 way sensor arrangement
62 sensor housing
64 sensor carriage
66 double arrow
68 cursor carrier
70 arms
70' arms in the lower position
70" arms in the upper position
72 arms
74 latch
74' latch (in lower position)
74" latch (in upper position)
76 latch
78 guide groove
80 guide groove
82 recess
84 recess
86 shift rail
87 longitudinal direction
88 catch recess
90 recess

The invention claimed is:

1. A way sensor arrangement for detecting displacement of a mechanical first component in relation to a second component, the arrangement comprising a sensor housing mounted to the first component and a sensor carriage that interacts with the sensor housing and can be coupled to the second component, the sensor carriage (12) is mounted to the sensor housing (4), in an assembled state of the sensor housing (4), displaceably in a direction of displacement of a displaceable component (shift rail 18) and a mutually interacting coupling device (catch projection 14, catch recess 16) is provided on at least one of the sensor carriage (12) and the second component (shift rail 18), to facilitate engagement the sensor carriage (12) with the second component.

2. The way sensor arrangement according to claim 1, wherein the coupling device comprises spring-loaded pre-tensioned catch elements (catch projection 14, catch recess 16) which, in the mounted state of the sensor housing, automatically snap in place in a defined displacement position of the first component in relation to the second component (shift rail 18).

3. The way sensor arrangement according to claim 2, wherein the catch elements (catch projection 14) that are pre-tensioned by spring devices (22) are provided on the sensor carriage (12), the catch elements latch to mating catch elements (catch recess 16) formed on the second component in a defined displacement position of the second component (shift rail 18).

4. The way sensor arrangement according to claim 3, wherein one or more of the catch elements (catch projection 14) of the sensor carriage (12) and components connected thereto (cursor tab 8) are adjusted, in relation to the sensor housing (4), from a first completely extended end position to a second completely retracted end position, and in the first and the second end positions, retention devices (40, 42; 52, 54) formed on one or more of the catch elements and the components connected thereto (cursor tab 8) and on the sensor housing are mutually engaged, which prevent displacement of the sensor carriage (12) in the sensor housing (4), and the retention devices (40, 42; 52, 54) are disengaged when the sensor carriage (12) is in an intermediate position between the first and second end positions.

5. The way sensor arrangement according to claim 4, wherein the sensor carriage (12) comprises a cursor tab (8) which can be adjusted on the sensor housing (4) in a direction perpendicular to a displacement movement of the sensor carriage (12) between the first end position, defined by stops, and the second end position, in which a catch projection (14), formed on the cursor tab, engages with a catch recess (16) of the second component (shift rail 18), and the cursor tab (8) carries a cursor carrier (10) that can be displaced in a same direction, by the spring devices (22) arranged between the cursor tab (8) and the cursor carrier (10), the spring devices (22), on one hand, bias the cursor carrier (10) against the sensor housing (4) and, on the other hand, bias the cursor tab (8) in a direction of the first end position.

6. The way sensor arrangement according to claim 5, wherein one or more of mutually interacting retention projections (40) and retention recesses (42) are formed on stop surfaces (36, 38) that define at least one of the first end position and the second end position of the cursor tab (8).

7. The way sensor arrangement according to claim 4, wherein the sensor carriage (64) comprises a cursor carrier (68) that cannot be displaced in a direction perpendicular to the displacement direction (double arrow 66), at least one latch (74, 76) is arranged on the sensor carriage (64) that can be displaced transversely to the displacement direction between the first end position and the second end position by a spring-loaded elastic arm (70, 72), and the at least one latch, in the two end positions, engages a mating catch recess (82, 84, 90) formed in the sensor housing (62).

8. The way sensor arrangement according to claim 7, wherein the way sensor detects displacement of the second component which comprises a shift rail having a substantially round cross-section, the cursor carrier (68) comprises two spring-loaded elastic arms (70,72) that encompass the shift rail (86) and each carry a respective latch (74, 76), and a peripheral groove (catch recess 88) is formed on the shift rail (86) for receiving the latches (74, 76).

9. A method for mounting a way sensor arrangement having a sensor housing mounted to a first component and a sensor carriage that interacts with the sensor housing and can be coupled to a second component, the sensor carriage (12) being mounted in the sensor housing (4), in an assembled state of the sensor housing (4), displaceably in a direction of displacement of a displaceable component (shift rail 18) and a mutually interacting coupling device (catch projection 14, catch recess 16) is provided on the sensor carriage (12) and on the second component (shift rail 18), to facilitate engagement the sensor carriage (12) with the second component, the method comprising the steps of:
  mounting the sensor housing (4) to the first component (gear case 6); and
  engaging the coupling device (catch projection 14, catch recess 16) of the sensor carriage (12) and the second component (shift rail 18) to engage the sensor carriage (12) with the second component.

10. The method according to claim 9, further comprising the step of mounting the sensor housing (4) to the first component (gear case 6) and moving the second component (shift rail 18) to a defined displacement position in which the coupling device (catch projection 14, catch recess 16) engages.

11. The method according to claim 10, further comprising the step of mounting the sensor housing (4) to the first component (gear case 6), such that catch elements (catch projection 14) of the sensor housing (12) are adjusted from a first end position, which locks the sensor carriage (12) in the displacement direction, into a second locking end position by coming in contact with the second component (shift rail 18), and subsequently moving the second component (shift rail 18) in the defined displacement position, with the catch elements (catch projection 14) of the sensor carriage (12) moved from the second end position to an intermediate position in which retention devices (40, 42; 52, 54) are disengaged.

* * * * *